United States Patent
Ohtake

[19]

[11] Patent Number: 5,907,410
[45] Date of Patent: May 25, 1999

[54] IMAGE PROCESSING APPARATUS CAPABLE OF DISPLAYING ONLY ALTERABLE PROCESS ITEMS

[75] Inventor: Shin Ohtake, Ebina, Japan

[73] Assignee: Fuji Xerox Co., Ltd., Tokyo, Japan

[21] Appl. No.: 08/791,163

[22] Filed: Jan. 30, 1997

[30] Foreign Application Priority Data

Jan. 31, 1996 [JP] Japan ................................ 8-015678

[51] Int. Cl.$^6$ ........................................................ H04N 1/32
[52] U.S. Cl. ...................... 358/468; 358/404; 358/444; 358/468; 395/114; 395/115
[58] Field of Search .................................. 358/437, 468, 358/404, 444; 395/113, 114, 115

[56] References Cited

U.S. PATENT DOCUMENTS 5,045,880  9/1991  Evanitsky et al. ........................... 399/82
5,579,447  11/1996  Salgado ..................................... 395/109
5,669,040  9/1997  Hisatake .................................... 399/83

FOREIGN PATENT DOCUMENTS

A-5-63883  3/1993  Japan .

*Primary Examiner*—Arthur G. Evans
*Assistant Examiner*—Sterling W. Chandler
*Attorney, Agent, or Firm*—Oliff & Berridge, PLC

[57] ABSTRACT

A job development task performs image processing on image data of input jobs. An output section control task causes the processed image data to be output from a print section, a FAX transmission/reception section, or the like. A job control task recognizes the execution state of a specified job. A UI control task determines alterable process items relating to the specified job in accordance with the recognized execution state, and causes those process items to be displayed on a display device of an operation section. As a result, in altering a certain process item of the job, the process items that can be set are displayed in accordance with the job state of the specified job, which allows the user to alter the process item correctly and quickly.

13 Claims, 11 Drawing Sheets

JOB MANAGEMENT TABLE

| ID NO. | DESCRIPTION |
|---|---|
| 0 | JOB STATE |
|   | JOB ATTRIBUTE INFORMATION |
| 1 | JOB STATE |
|   | JOB ATTRIBUTE INFORMATION |
| ⋮ | ⋮ |
| n - 1 | JOB STATE |
|   | JOB ATTRIBUTE INFORMATION |

FIG. 9

JOB ATTRIBUTE INFORMATION

| ATTRIBUTE NAME | DESCRIPTION |
|---|---|
| JOB NAME | NAME OF THE JOB |
| DATA TYPE | EMULATION, PRINT LANGUAGE, FAX DOCUMENT |
| NUMBER OF COPIES | NUMBER OF PRINT COPIES OF THE JOB |
| FORM NO. | FORM NO. |
| INPUT SOURCE INFORMATION | INFORMATION ON INPUT SECTION (READ SECTION, HOST CONNECTION SECTION, LAN, FAX) |
| IMAGE PROCESSING IFORMATION | PRINT DENSITY, MAGNIFICATION, FILTER CHARACTERISTICS, ETC. |
| OUTPUT DESTINATION IFORMATION | INFORMATION ON OUTPUT SECTION (PRINT SECTION, HOST CONNECTION SECTION, LAN, FAX) |
| OUTPUT TIME | OUTPUT TIME OF DAY (IMMEDIATELY, SPECIFIED TIME OF DAY) |
| SYSTEM TIME | SYSTEM TIME OF DAY WHEN THE JOB ENTERED INTO THE CURRENT STATE AS MEASURED FROM POWER-ON |
| TRANSITION DURATION | DURATION UNTIL TRANSITION FROM THE CURRENT JOB STATE TO THE NEXT JOB STATE |

FIG. 10

PROCESS ITEM MANAGEMENT TABLE

| | PROCESS ITEM | READY | PROCESSING | COMPLETE |
|---|---|---|---|---|
| JOB CONTROL | INTERRUPT COPY/PRINT | DISABLED | INTERRUPT KEY | DISABLED |
| | STOP | STOP KEY | STOP KEY | DISABLED |
| | SUSPENSION | DISABLED | SUSPENSION KEY | DISABLED |
| | ALL CLEAR | DISABLED | DISABLED | DISPLAY/SETTING ENABLED |
| | ADVANCED RESERVATION | DISPLAY/SETTING ENABLED | DISPLAY/SETTING ENABLED | DISPLAY/SETTING ENABLED |
| | CONFIRMATION | DISABLED | DISPLAY ENABLED | DISABLED |
| JOB INFORMATION | JOB NAME | DISPLAY/SETTING ENABLED | DISPLAY/SETTING ENABLED | DISPLAY ENABLED |
| | DATA TYPE | DISPLAY ENABLED | DISPLAY ENABLED | DISPLAY ENABLED |
| | NUMBER OF COPIES | DISPLAY/SETTING ENABLED | DISPLAY ENABLED | DISPLAY ENABLED |
| | FORM NO. | DISPLAY/SETTING ENABLED | DISPLAY ENABLED | DISPLAY ENABLED |
| | INPUT SOURCE INFORMATION | DISPLAY ENABLED | DISPLAY ENABLED | DISPLAY ENABLED |
| | IMAGE PROCESSING INFORMATION | (SEE BELOW) | | |
| | OUTPUT DESTINATION IFORMATION | DISPLAY/SETTING ENABLED | DISPLAY ENABLED | DISPLAY ENABLED |
| | OUTPUT TIME | DISPLAY/SETTING ENABLED | DISPLAY/SETTING ENABLED | DISPLAY ENABLED |
| IMAGE PROCESSING INFORMATION | GENERAL | DISPLAY/SETTING ENABLED | DISPLAY/SETTING ENABLED | DISPLAY ENABLED |
| | COLOR FILTER CHARACTERISTICS | DISPLAY/SETTING ENABLED | DISPLAY/SETTING ENABLED | DISPLAY ENABLED |
| | BINARY FILTER CHARACTERISTICS | DISPLAY/SETTING ENABLED | DISPLAY/SETTING ENABLED | DISPLAY ENABLED |
| SYSTEM CONTROL | OFF-LINE | DISPLAY/SETTING ENABLED | DISPLAY/SETTING ENABLED | DISPLAY/SETTING ENABLED |
| | AUTOMATIC PREHEATING | DISPLAY/SETTING ENABLED | DISPLAY/SETTING ENABLED | DISPLAY/SETTING ENABLED |
| | JOB MEMORY | DISPLAY/SETTING ENABLED | DISPLAY/SETTING ENABLED | DISPLAY/SETTING ENABLED |
| | BILLING COUNT | DISPLAY ENABLED | DISPLAY ENABLED | DISPLAY ENABLED |

FIG. 11A

| JOB NO. | JOB NAME | INPUT SOURCE INFORMATION | OUTPUT DESTINATION INFORMATION |
|---|---|---|---|
| 1 | DOCUMENT-1 | JOHN TAYLOR | FACSIMILE |
| 2 | ACCOUNTING TABLE-1 | NANCY SMITH | PRINTER |
| 3 | ACCOUNTING TABLE-2 | NANCY SMITH | PRINTER |
| 4 | ACCOUNTING TABLE-3 | NANCY SMITH | PRINTER |
| 5 | CATALOG | FACSIMILE | PRINTER |
| 6 | ADVICE NOTE | NANCY SMITH | FACSIMILE |
| 7 | DOCUMENT-1 | JOHN TAYLOR | PRINTER |
| 8 | NONE | SCANNER | PRINTER |

FIG. 11B

JOB NO. : 5

| | | |
|---|---|---|
| JOB NAME | DOCUMENT-1 | 3 MIN 53 SEC |
| STATE | READY | 3 MIN 32 SEC |
| DATA TYPE | WORD PROCESSOR DOCUMENT (256 COLORS) | |
| NUMBER OF COPIES | 1 | 3 MIN 53 SEC |
| FORM NO. | NOT SPECIFIED | 3 MIN 32 SEC |
| INPUT SOURCE INFORMATION | USER NAME: FRED CARTER | |
| IMAGE PROCESSING INFORMATION | TEXT | 3 MIN 32 SEC |
| OUTPUT DESTINATION INFORMATION | FACSIMILE (IMMEDIATELY) | 3 MIN 53 SEC |

FIG. 12A

JOB LIST OF (INPUT SOURCE INFORMATION) = (NANCY SMITH)

| JOB NO. | JOB NAME | INPUT SOURCE INFORMATION | OUTPUT DESTINATION INFORMATION |
|---|---|---|---|
| 2 | ACCOUNTING TABLE-1 | NANCY SMITH | PRINTER |
| 3 | ACCOUNTING TABLE-2 | NANCY SMITH | PRINTER |
| 4 | ACCOUNTING TABLE-3 | NANCY SMITH | PRINTER |
| 6 | ADVICE NOTE | NANCY SMITH | FACSIMILE |

FIG. 12B

JOB LIST OF
(INPUT SOURCE INFORMATION/OUTPUT DESTINATION INFORMATION) = FACSIMILE

| JOB NO. | JOB NAME | INPUT SOURCE INFORMATION | OUTPUT DESTINATION INFORMATION |
|---|---|---|---|
| 1 | DOCUMENT-1 | JOHN TAYLOR | FACSIMILE |
| 5 | CATALOG | FACSIMILE | PRINTER |
| 6 | ADVICE NOTE | NANCY SMITH | FACSIMILE |

FIG. 13A

| PROCESS ITEM MANAGEMENT TABLE | | DATA TYPE | | |
|---|---|---|---|---|
| PROCESS ITEM | | COLORS | +N COLORS | BINARY |
| IMAGE PROCESSING INFORMATION | GENERAL | ○ | ○ | ○ |
| | COLOR FILTER CHARACTERISTICS | ○ | ○ | × |
| | BINARY FILTER CHARACTERISTICS | × | ○ | ○ |

FIG. 13B

| PROCESS ITEM MANAGEMENT TABLE | | INPUT SOURCE INFORMATION | | |
|---|---|---|---|---|
| PROCESS ITEM | | READ SECTION | FAX TRANSMISSION/ RECEPTION SECTION | HOST CONNECTION SECTION/LAN CONNECTION ECTION |
| IMAGE PROCESSING INFORMATION | GENERAL | ○ | ○ | ○ |
| | COLOR FILTER CHARACTERISTICS | ○* | × | × |
| | BINARY FILTER CHARACTERISTICS | ○* | ○ | × |

* EITHER ONE BECOMES SETTABLE IN ACCORDANCE WITH THE DISCRIMINATION RESULT OF A DOCUMENT READ.

FIG. 14

SETTING OF IMAGE PROCESSING INFORMATION

| | |
|---|---|
| GENERAL | SETTABLE |
| COLOR FILTER CHARACTERISTICS | SETTABLE AFTER A LAPSE OF 32 SEC |
| BINARY FILTER CHARACTERISTICS | SETTABLE AFTER A LAPSE OF 32 SEC |

IMAGE PROCESSING APPARATUS CAPABLE OF DISPLAYING ONLY ALTERABLE PROCESS ITEMS

BACKGROUND OF THE INVENTION

1. Field of the Invention

This invention relates to an image processing apparatus and a display control method thereof which, in executing a plurality of jobs, display job contents in accordance with execution states of the jobs.

2. Description of the Related Art

At present, so-called composite machines are widely used which have a copy function, a printer function, a facsimile function, etc. and execute a plurality of jobs in parallel. In those machines, there may occur a case that for a certain reason it becomes necessary to stop one of the jobs being executed. Therefore, the composite machines need to have a function of specifying a job to be stopped. However, it is not feasible to provide a stop key for each job.

A facsimile machine which displays a "detailed message screen" for a desired one of the jobs being executed and, when a stop key is pressed in this state, suspends the job related to the display has been proposed. (See, for example, Japanese Unexamined Patent Publication No. Hei. 5-63883.) In this technique, when the user performs a given operation, the jobs being executed are displayed on a display device. Then, the user presses an "arrow key" for selecting any desired job. If the user presses a "YES key" with the desired job selected, a detailed message screen for the selected job is displayed.

However, the above technique involves the following problems.

First, preferred operations to be performed by the user on the jobs being executed is not limited to stopping one of the jobs. For example, the user may be obliged to change the filter characteristics, the output destination, or the like in image processing while allowing jobs to continue The technique of the above publication does not allow such operations.

Second, since all jobs are displayed on the display device in the above technique, if a large number of jobs exist, it is cumbersome to select a job to be stopped from among the displayed jobs.

SUMMARY OF THE INVENTION

It is therefore an object of the invention to provide an image processing apparatus and a display control method thereof which provide both rich functions and a high degree of ease of operation by improving the ease of operation in specifying various settings and changes for jobs even with a number of functions performed by the image processing apparatus.

To attain the above object, according to the invention, there is provided an image processing apparatus comprising image processing means for performing image processing on image data of input jobs; execution state recognizing means for recognizing an execution state of a specified job; process item determining means for determining an alterable process item or items relating to the specified job in accordance with the recognized execution state of the specified job; and process item display means for displaying the alterable process item or items.

Alternatively, there may be provided a process item determining means which determines an unalterable process item or items relating to the specified job in accordance with the recognized execution state of the specified job.

With the above configuration, only the alterable job process items are displayed to the user in accordance with the execution state of the job. Therefore, the user can easily set or alter the job to be executed by the image processing apparatus which performs various types of processing for a plurality of jobs.

BRIEF DESCRIPTION OF THE DRAWINGS

FIG. 10 shows a process item management table used in the image processing apparatus;

DESCRIPTION OF THE PREFERRED EMBODIMENT

A: Configuration of Embodiment

Figure 1:
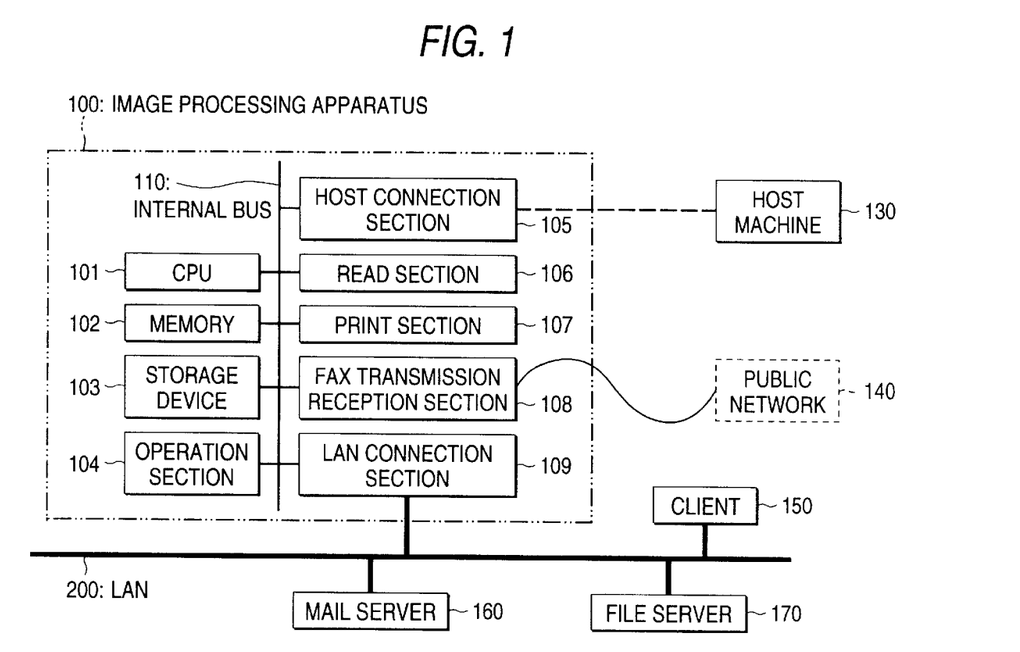
FIG. 1 is a block diagram showing the configuration of an image processing apparatus according to an embodiment of the invention.

Referring now to the accompanying drawings, a preferred embodiment of the invention will be hereinafter described. FIG. 1 is a block diagram showing the configuration of an image processing apparatus according to this embodiment.

As shown in FIG. 1, an image processing apparatus 100 is connected to a host machine 130 via a host connection section 105 as well as to a LAN (local area network) 200 via a LAN connection section 109. A mail server 160, a file server 170, a client 150, and the like are connected to the LAN 200. The LAN connection section 109 enables data transmission and reception according to a plurality of protocols In the image processing apparatus 100, a CPU 101 controls the respective components in the image processing apparatus 100 via an internal bus 110 based on programs described later Reference numerals 102 and 103 denote a memory and a storage device such as a hard disk drive, respectively; various kinds of data are stored in those devices by the CPU 101. An operation section 104 incorporates a display device such as a color liquid crystal display and an operation panel (touch panel). The user can recognize various kinds of information through the display device and also give various instructions to the CPU 101 through the operation panel A read section 106 such as a scanner reads the contents of a document set and outputs image data via the internal bus 110 A print section 107 prints out image data supplied via the internal bus 110 on sheets. A FAX transmission/reception section 108 transmits and receives facsimile data to and from a public network 140.

Figure 2:
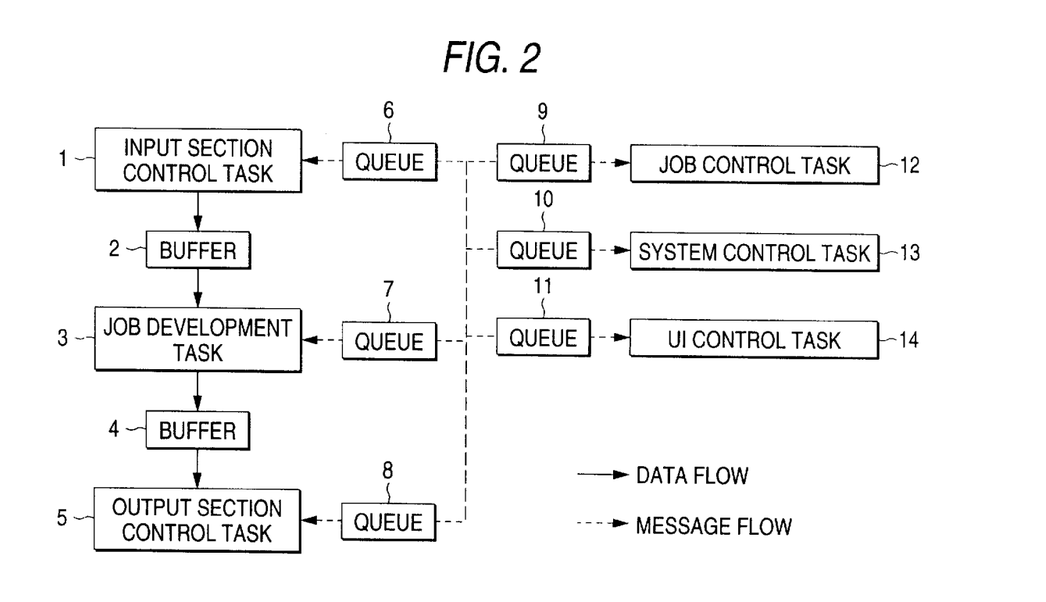
FIG. 2 is a block diagram outlining the software configuration of the image processing apparatus.

Next, the software configuration of the embodiment will be outlined with reference to FIG. 2. In the figure, an input section control task 1 manages various data that are input via the host connection section 105, the read section 106, the FAX transmission/reception section 108, or the LAN connection section 109. Input data are stored in a buffer 2 allocated to a predetermined area of the memory 102. The buffer 2 can be implemented by a file, a page memory, a ring buffer, or the like.

A job development task 3 performs image processing such as rotation, scaling, filtering, etc. on the data stored in the buffer 2 and stores a processing result in a buffer 4 in the memory 102. Like the buffer 2, the buffer 4 is also implemented by a file, a ring buffer, a page memory, a banding memory, or the like. An output section control task 5 reads data stored in the buffer 4 and outputs causes the print section 107 or the FAX transmission/reception section 108, or the like to output data. A job control task 12 performs processing such as job generation, deletion, etc.

Each of the above tasks transmits and receives necessary information to and from the other tasks. Such information will be hereinafter referred to as a message. Queues 6–11, i.e., queue buffers (FIFOs) store messages directed to the respective tasks. That is, a message transmitted from one task to another task is stored in the queue corresponding to the latter task, and the latter task reads the message from the corresponding queue and performs processing.

A system control task 13 supplies necessary messages to the other tasks in accordance with the system state, such as an open/closed state of a tray lid or a state of whether a temporary stop button is pressed A UI control task 14 sends instructions as to transmission of various messages in response to the user's operation on the operation section 104 or a remote operation section (not shown), and causes the display device of the operation section 104 to display information corresponding to a received message.

The remote operation section, which is located in the client 150 or the like, has an operation panel similar to that in the operation section 104 which is implemented as a GUI (graphical user interface), and input to and output from the remote operation section are effected via a communication line, or the like.

B: Operation of Embodiment

B-1: Data Reception

Figure 3:
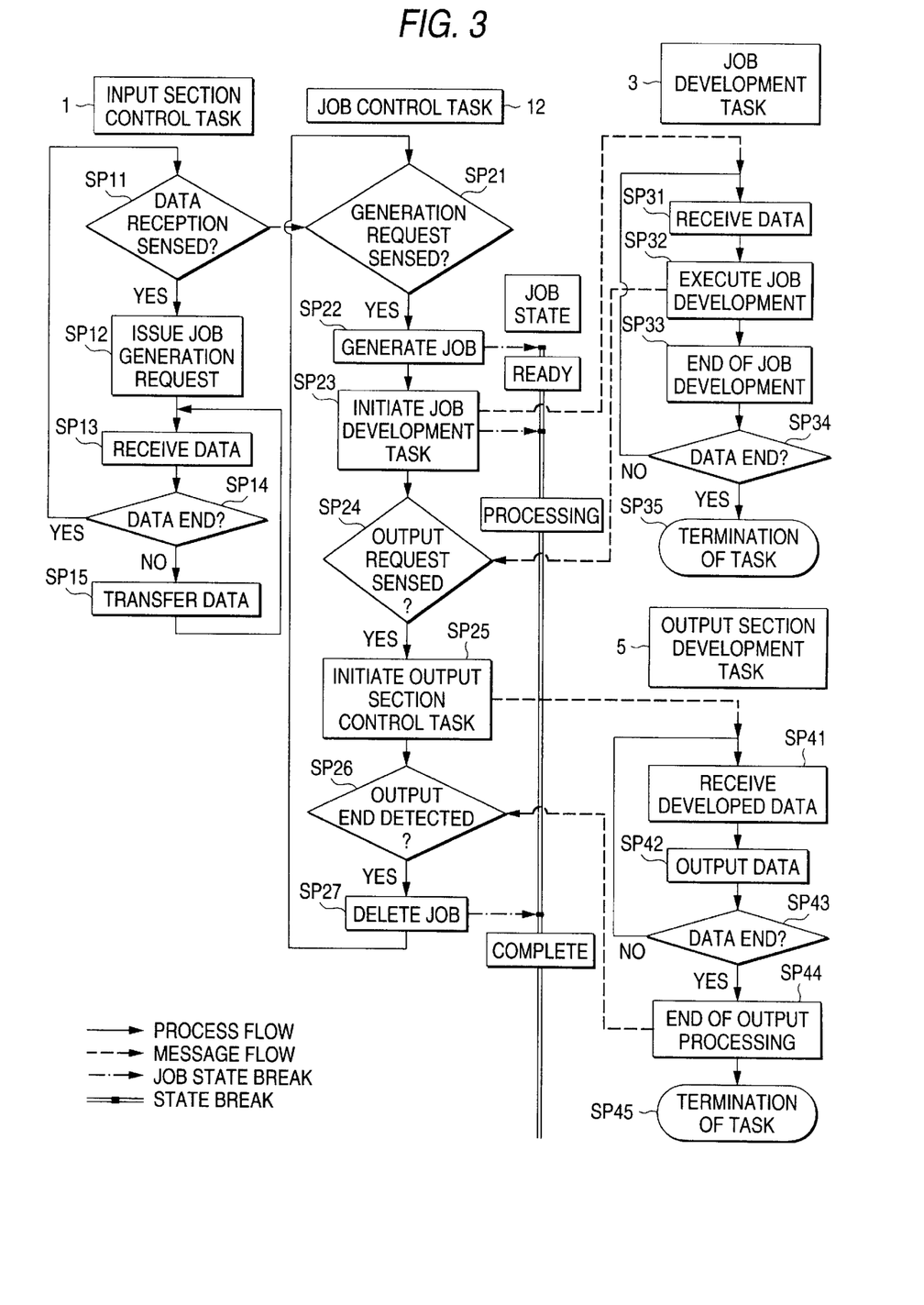
FIG. 3 is a flowchart showing the operation of the image processing apparatus.

The operation of the image processing apparatus according to the embodiment will be discussed with reference to FIG. 3. In the figure, steps SP11–SP15 corresponds to the operation of the input section control task 1. In the input section control task 1, the control stands by at step SP11 until data reception is sensed through the read section 106, the FAX transmission/reception section 108, or the LAN connection section 109 (these sections will be hereinafter collectively called an input device). When data reception is sensed, the control goes to step SP12.

At step SP12, a job generation request is output to the job control task 12 in response to the sensed data reception.

Next, at step SP13, actual data is received through the input device. Examples of data to be received are data written in a page description language as typified by ESC/P (registered trademark), PostScript (registered trademark), a facsimile document of G3, for instance, image data of JPEG, for instance, and electronic mail of MINE, for instance At step SP14, it is judged whether the received data is the end of a sequence of data. If the judgment result at step SP14 is NO, the control goes to step SP15, where the received data is transferred to the job development task 3 via the buffer 2.

As steps SP13–SP15 are repeated, and the received data are sequentially transferred to the job development task 3. When the end data is received, the judgment result at step SP14 becomes YES and the control returns to step SP11.

Thus, the control stands by at step SP11 until new data reception is sensed. When reception is sensed, the above-described process is repeated to transfer all the sequence of data.

B-2: Job Generation and Development

At step SP12, a job generation request is output to the job control task 12 as described above. Upon reception of the generation requests steps SP21–SP27 are executed in the job control task 12. First, when generation request reception is sensed at step SP21, the control goes to step SP22, where a new job corresponding to the job generation request is generated.

Figure 8:
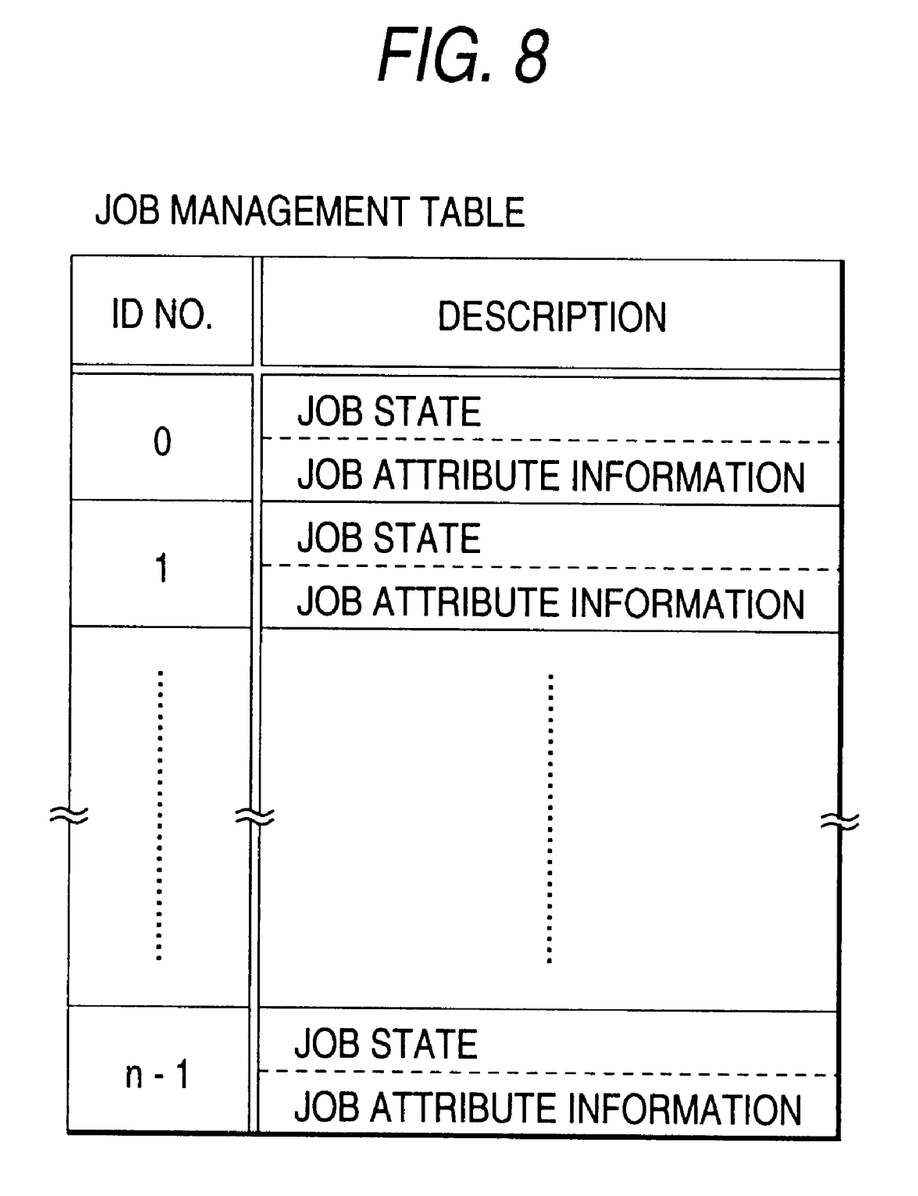
FIG. 8 shows a job management table used in the image processing apparatus.

The memory 102 stores a job management table as shown in FIG. 8, which contains n storage areas that are assigned identification numbers 0 to n-1 for respective jobs. The job management table stores a job state and job attribute information for each identification number. At step SP22 shown in FIG. 3, an empty storage area is found in response to the job generation request and a job state and job attribute information are written into the storage area thus found.

Figure 9:
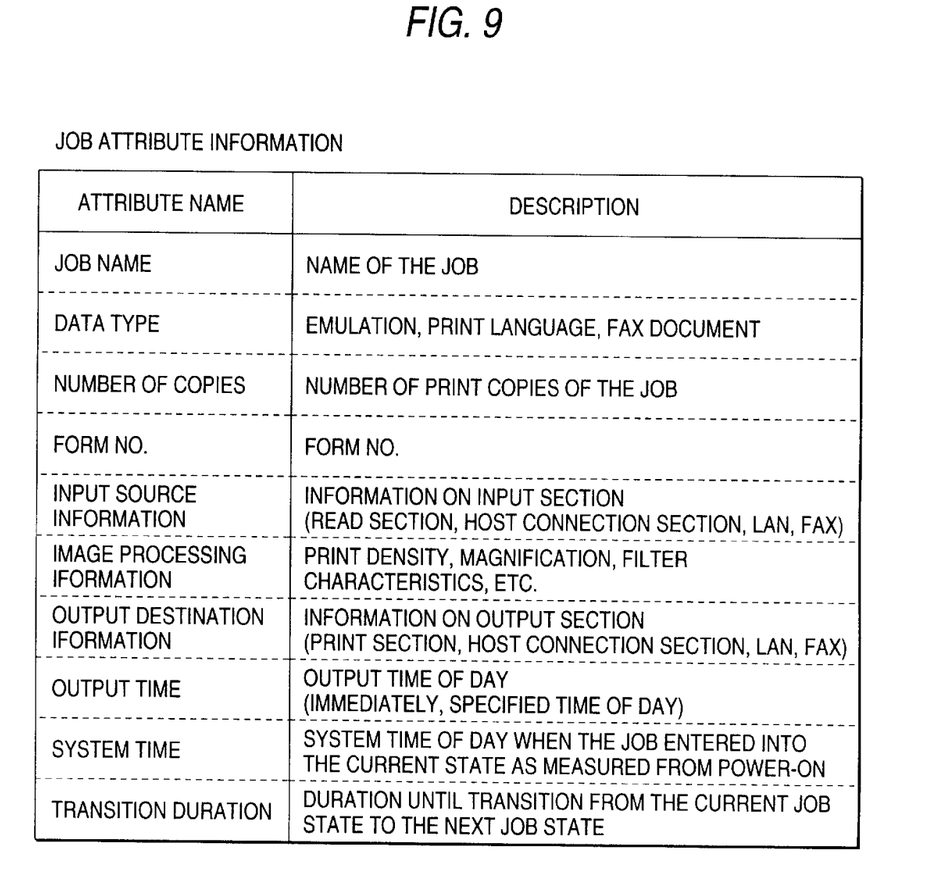
FIG. 9 shows the contents of job attribute information in the job management table of FIG. 8.

The job attribute information consists of the following items as shown in FIG. 9:

Job name: Is the name of the job.

Data type: Indicates the data type, such as emulation, print description language, or FAX document.

Number of copies: Is the number of print copies of the job.

Form No.: Specifies the form number.

Input source information: Indicates the input device of the job, such as the read section 106, host connection section 105, FAX transmission/reception section 108, LAN 200, or the like.

Image processing information: Indicates the print density, magnification, filter characteristics, of the like of the job.

Output destination information Indicates the output device of the job, such as the host connection section 105, print section 107, FAX transmission/reception section 108, LAN 200, or the like.

Output time: Indicates the output time of day of the job, i.e., immediate output (output is effected as soon as it is enabled) or a specific time point.

System time: Indicates the time of day at which the job entered into the current job state.

Transition duration: Indicates the duration until transition from the current job state to the next job state. The transition duration is calculated by the job control task 12 based on the load state of the whole system measured by the system control task 13 and past measurement values. The transition duration is also displayed when process items are displayed on the operation section 104 by the UI control task 14.

The job state is one of the three states "ready," "processing," and "complete." When a new job is generated at step SP22, the job state is set to "ready."

Referring again to FIG. 3, when the control goes to step SP23, the job development task 3 is initiated to execute steps SP31–SP35. At this time point, the job state is set to "processing" from "ready" At step SP31 of the job development task 3, the data transferred in the input section control task 1 (steps SP13–SP15) is received through the buffer 2. Next, at step SP32, job development is performed; that is, the input data is developed into a data format that enables data output The development result is stored in the buffer 4.

In any situation, the job development task 3 operates only for a single job. Therefore, if requests for initiating the job development task 3 occur for more than one job, the execution order of the jobs is stored in the job queue 7 (FIFO). Upon completion of the job development, the control goes to step SP33, where the job control task 12 is notified of an output request.

When the control goes to step SP34, it is judged whether the developed data is the end of a sequence of data If the judgment result is NO, the control returns to step SP31. Steps SP31–SP34 are repeated until the data end is sensed If the data end is sensed at step SP34, the job development task 3 is terminated.

B-3: Output Processing and Job Deletion

The output request that is output at step SP33 of the job development task 3 is sensed at step SP24 of the job control task 12. When the request is sensed, the control goes to step SP25 and the output section control task 5 is initiated to execute steps SP41–SP45. Upon the initiation of the task 5, at step SP41, the result of the job development previously executed at step SP32 is received via the buffer 4.

Next, at step SP42, the received data is output to one of the print section 107, the FAX transmission/reception section 108, and the LAN connection section 109 (these sections will be hereinafter collectively called an output device) in accordance with the output destination information of the job. At step SP43, it is judged whether the output data is the end of a sequence of data. If the judgment result NO, the control returns to step SP41. Steps SP41–SP43 are repeated to sequentially output all the data that are to be output.

When the end data is output, the judgment result at step SP43 should be YES. Resultantly, the control goes to step SP44, where the job control task 12 is notified that the output process has terminated, and the task 5 is terminated at step SP45.

When the job control task 12 receives at step SP26 the notification indicating that the output process has terminated, the control goes to step SP27, where the job is deleted. Once the job is deleted, the job state of the job is set to "complete." The tasks described above can operate in parallel in a multitask environment For example, when reception of the Nth data coming from the input device is completed, reception of the (N+1)th data onward can be effected before output of the Nth data is completed.

C: Various Operations on Jobs

The embodiment enables the user to perform, by inputting his instruction, various operations on jobs, such as display or setting of job attribute information, for instance, or suspension of control of a job. Items in conjunction with jobs which items can be caused to be displayed or set by the user are called "process items."

FIG. 10 is an illustration to explain a process item management table, which lists process items and indicates whether display and/or setting is enabled or disabled, for each job state.

In FIG. 10, "display enabled" means that the contents of the process item can be caused to be displayed on the display device of the operation section 104, but cannot be set (i.e., altered) by the user through the operation section 104.

"Display/setting enabled" means that the contents of the process item can be both caused to be displayed and set by the user through the operation section 104, or the like.

"Disabled" means that the contents of the process item cannot be caused to be displayed nor set by the user through the operation section 104, or the like.

For the process items "interrupt copy/print," "stop," and "suspension," the operation section 104 is provided with dedicated keys. "Disabled" means that an operation on the key is invalid. "Interrupt key," -"stop key," or "suspension key" mean that corresponding key operations are effective.

In this embodiment, the effective time is calculated for each process item The effective time means the time during which setting, alteration, etc. can be effected for the process item, and equals the (remaining) time until transition from the current job state to the next job state. The job control task 12 calculates the effective time based on the job attribute information (see FIG. 9), the load state of the whole system measured by the system control task 13, and past measurement values. It calculates the effective time when the UI control task 14 causes the corresponding process item to be displayed.

Specific user-instructed operations in connection with jobs which are assumed in this embodiment will be discussed below.

C-1: Job List Display

First, job list display in the embodiment will be discussed. It is a process for showing, to the user, alterable process items relating to the jobs that are currently registered.

Figure 4:
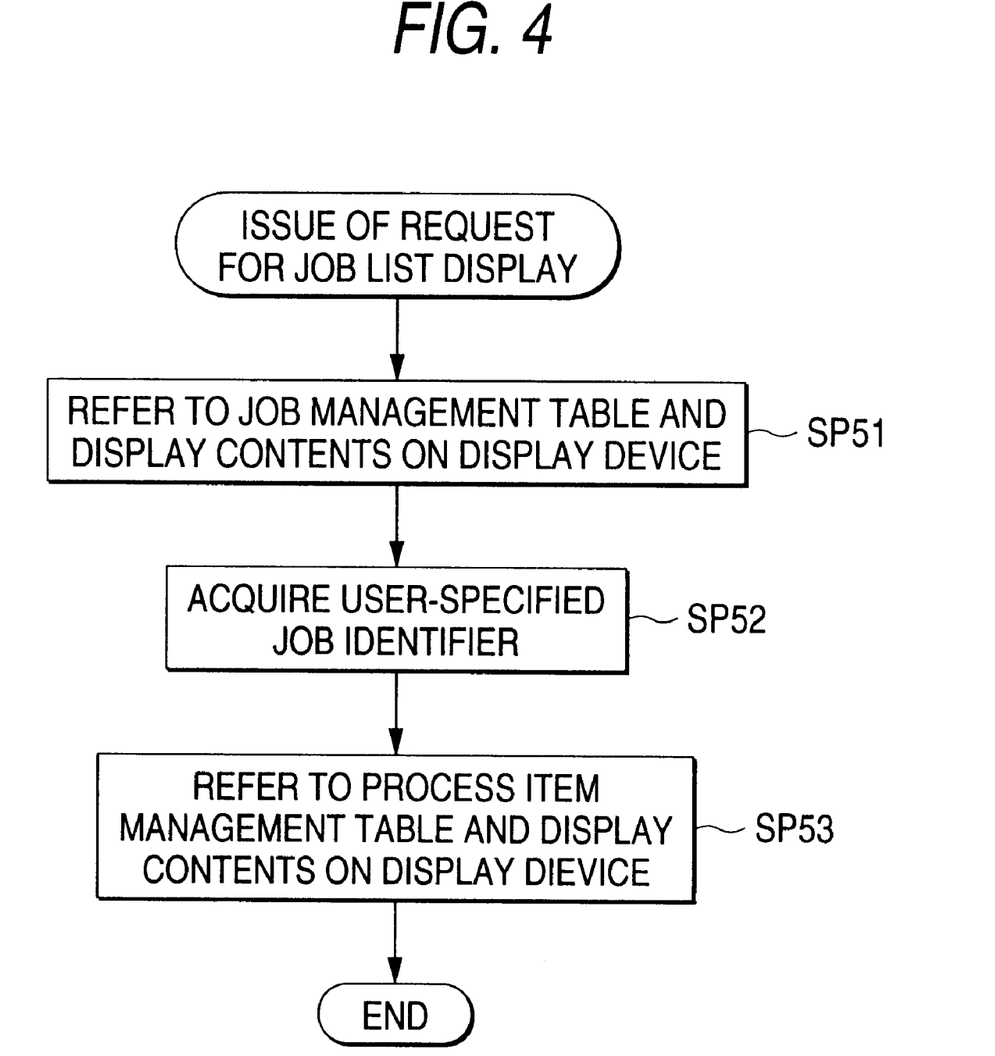
FIG. 4 is a flowchart showing a job process item display process in the image processing apparatus.
Figure 11A:
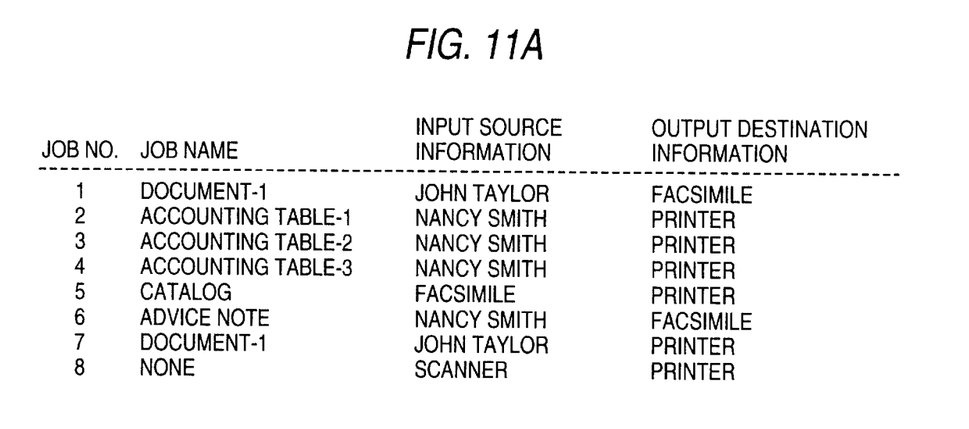
FIGS. 11A and 11B are examples of display on a display device of the image processing apparatus.

First, to list jobs, the user performs a predetermined operation on the operation section 104. In response, the UI control task 14 executes a program shown in FIG. 4. Referring to FIG. 4, when the control goes to step SP51, the job management table (see FIG. 8) is read and the contents of the table are displayed on the display device of the operation section 104. That is, all jobs currently registered are displayed. FIG. 11A shows an example of display Next, when the user specifies one job on the operation section 104, the control goes to step SP52, where the specified job number (identification number) is obtained. The following processing is performed at step SP53 according to the job identification number thus obtained.

At step SP53, first the job state and the job attribute information corresponding to the job identification number are read from the job management table (see FIG. 8). Second, the process item management table (see FIG. 10) is referenced and process items being "display enabled" or "display/setting enabled" under the job state concerned are extracted from the table. Third, the extracted process items are displayed on the display device of the operation section 104 by referencing the job information corresponding to the job concerned. Therefore, process items being "disabled" are not displayed on the display device. In FIG. 10, if "disabled" is entered in the process item "interrupt copy/ print," "stop," or "suspension," a message to that effect is displayed on the display device.

Figure 11B:
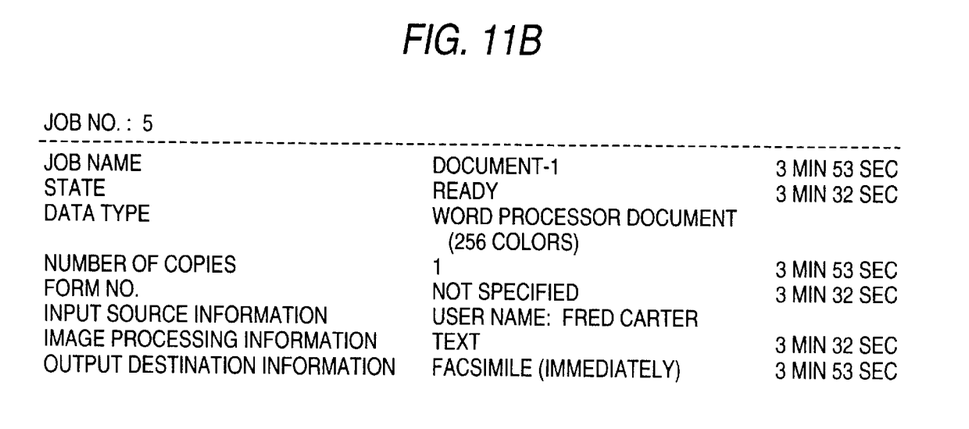

"Display enabled" process items are distinguished from "Display/setting enabled" process items by displaying those in different colors. In this case, the "display enabled" process items, whose contents cannot be changed, should be displayed in a lighter color than the "display/setting enabled" process items. An effective time is also displayed for each of the "display/setting enabled" process items. FIG. 11B shows an example of display provided at step SP53.

This display example relates to a job "a user named Fred Carter who logs in the LAN 200 transmits a color word processor document via the FAX transmission/reception section 108." As for this job, the facsimile transmission time specification is "immediately." Actually, however, since four preceding jobs with identification numbers "1" to "4" are registered in the job queue, the job concerned will be executed after waiting of "3 min 53 sec." The effective time being displayed (see FIG. 11B) is updated on a real-time basis with the passage of time.

Thus, the job list display is performed such that display-enabled process items of the job are displayed while display-disabled process items of the job are not displayed. Further, "display/setting enabled" process items are displayed in a different color than the other kinds of process items. Therefore, the user, who need not be conscious of which of job process items can be altered, can input instructions correctly and quickly, thus improving the ease of operation.

A process in which the user specifies a desired one of the jobs in the displayed list and alters the contents of a process item of the specified job will be discussed below.

C-2: Process Item Alteration

Figure 5:
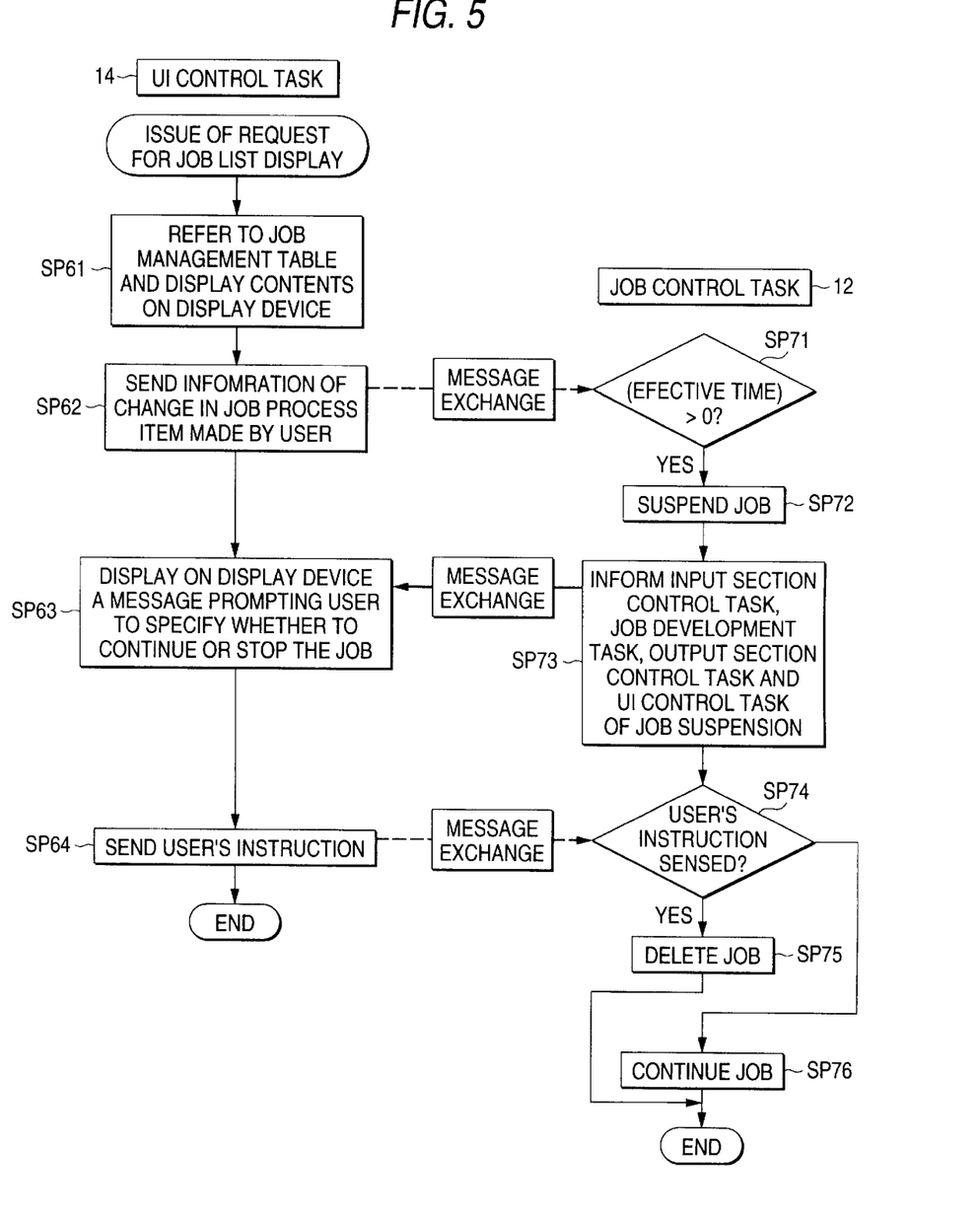
FIG. 5 is a flowchart showing a job process item alteration process in the image processing apparatus.

A process in which the user alters a job process item will be discussed with reference to FIG. 5 To alter a job process item, first the user performs a predetermined operation on the operation section 104 as in the case of the above-described job list display In response, the UI control task 14 executes a program shown in FIG. 5.

First, at step SP61 of the program, the UI control task 14 executes the same process as step SP51 shown in FIG. 4, to list all registered jobs on the display device of the operation section 104.

Next, when the user specifies one job on the operation section 104, the UI control task 14 executes the same process as steps SP52 and SP53, to display process items of the specified job in different colors.

In this state, the user selects a desired "display/setting enabled" process item among the displayed process items by operating the operation section 104, and alters (sets) a parameter indicating the content of the process item, such as the print density in image processing information In response, the UI control task 14 notifies the job control task 12 of the altered content at step SP62.

Upon reception of the altered content, the job control task 12 updates the job attribute information in the job management table (see FIG. 8) in accordance with the received altered content at step SP71. When the altered content is received, if the effective time of the process item to be altered is greater than zero, the job control task 12 suspends the execution of the job relating to the alteration at step SP72 and notifies the input section control task 1, the job development task 3, the output section control task 5, and the UI control task 14 of the suspension the job at step SP73, as shown in FIG. 5.

If the effective time of the process item to be altered is equal to or less than zero when the altered content is received, which means that the job corresponding to the process item concerned has already been executed, the job control task 12 notifies the UI control task 14 that the job alteration failed.

When notified of the job suspension by the job control task 12, the UI control task 14 displays a message prompting the user to specify whether to continue or stop the job on the display device of the operation section 104 at step SP63.

When the user responds to the prompting message with an instruction to continue or stop the job, the UI control task 14 notifies the job control task 64 of the content of the user's instruction at step SP64.

Upon reception of the content of the user's instruction, the job control task 12 judges the content of the instruction at step SP74 and performs processing in accordance with the judgment result. That is, if the judgment result is continuation of the job, the job control task 12 causes the control to branch off to step SP76, to continue the execution of the job. If the judgment result is stop of the job, the job control task 12 causes the control to branch off to step SP75, to delete the job from the job management table.

As described above, in the process item alteration process, setting-enabled process items are displayed in accordance with the job state of the job concerned, and the user simply specifies one of those items and alters its content. Thus, he can alter job process items correctly and quickly.

For each of the setting-enabled process items, the effective time is displayed in addition to its contents Such proper instructions from the apparatus side contributes to reduction in the possibility that the user makes an erroneous operation.

If the effective time of the process item relating to the alteration is greater than zero, the corresponding job is suspended, but is restarted if the user specifies continuation of the job. Thus, the process item alteration is prevented from becoming impossible during the effective time.

Some process item alterations may affect not only the job concerned but also other registered jobs. For example, an alteration with respect to toner loaded in the print section 107 affects all the subsequent jobs, and system reset affects not only jobs but also the operation of the whole apparatus. If the job control task 12 receives a notification to the effect that such type of alteration should be made, it interrupts the execution of all jobs entered in the job queue and notifies the UI control task 14 to that effect. In response, the UI control task 14 informs the user to that effect through the display device of the operation section 104.

A process item alteration may be effected not only for one job, but also for all jobs satisfying a certain condition. Examples of such type of operation are deletion of jobs related to a specific user and demounting of an IC card storing a job development program for a specific data type. In such a case, the job control task 12 extracts jobs satisfying the condition by referring to the job attribute information of the job management table, and suspends these jobs en bloc. For example, if the job control task 12 receives a notification of an alteration relating to jobs received from a specific input medium, it refers to the input source information of the job attribute information and suspends, en bloc, all processing relating to the jobs that were input from the input medium concerned.

C-3: Job Extraction

A process in which the user extracts desired jobs will be discussed below.

In this embodiment, jobs are extracted with an inquiry location, an inquiry person, and a job function as used retrieval keys. The inquiry location can be recognized from an identifier indicating the inquiry location. Examples of the inquiry location are the operation section 104 of the apparatus main body and a remote operation section connected via the LAN 200 or the public network 104. Likewise, the inquiry person can be recognized from an identifier indicating the inquiry person, examples of which are the administrator and a user as a person having the use right. In this case, a user ID or the like is used as the identifier indicating the inquiry person. The job function means the content of a process item.

To extract desired jobs, the user performs a predetermined operation on the operation section 104 as in the case of the above-described job list display In response, the UI control task 14 is notified of, as a job list display request, an identifier indicating the location where the operation was performed and an identifier indicating the inquiry person. Where the user makes an extraction instruction with a certain function as a retrieval key, an identifier indicating the specified function is included in the job list display request.

If a job list display request is made through the operation section 104 of the apparatus main body, the user name is made "local." If a job listing request is made through the operation section of a terminal over a communication line, a user name used in the communication protocol is included in the job list display request. In general, such a user name consists of a character string according to S-JIS or the like.

Figure 6:
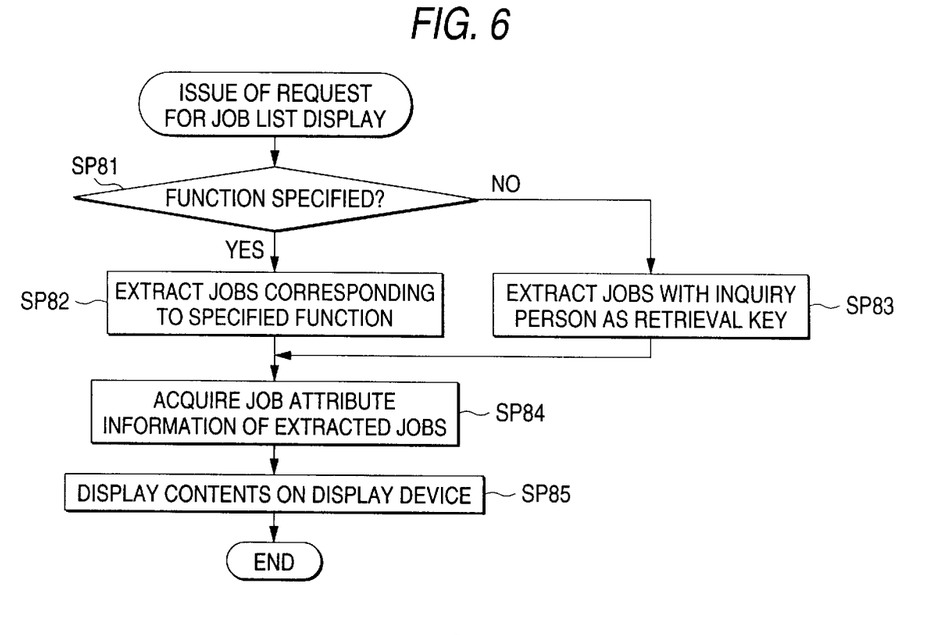
FIG. 6 is a flowchart showing a job information extraction process in the image processing apparatus.

When notified of the job listing request, the UI control task 14 executes a program shown in FIG. 6.

First, at step SP81 of the program, the UI control task 14 judges whether a function was specified in the user's job extraction operation; more particularly, it determines whether the job list display request contains an identifier indicating a function.

The UI control task 14 executes the following jobs depending on the judgment result, i.e., whether a function is specified or not. If a function is specified, the UI control task 14 extracts jobs having process item contents matching the function indicated by the identifier contained in the job list display request by referencing the job management table (see FIG. 8) at step SP82. On the other hand, if a function is not specified, the UI control task 14 extracts jobs having input source information contents of process items matching the inquiry person (or inquiry location) indicated by the identifier contained in the job list display request at step SP83. Then, the UI control task 14 acquires the job attribute information of the extracted jobs at step SP84, and causes the contents of the job attribute information to be displayed on the display device of the operation section 104 at step SP85.

Figure 12A:
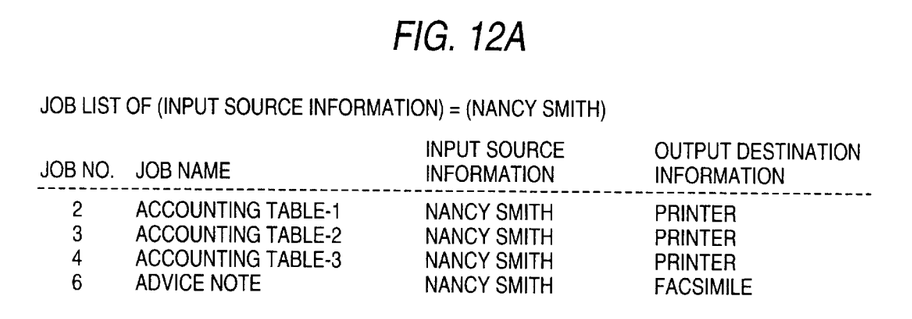
FIGS. 12A and 12B are examples of display on the display device of the image processing apparatus.
Figure 12B:
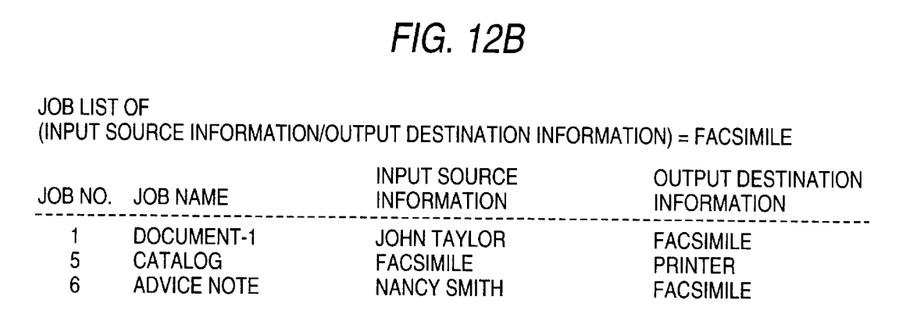

FIGS. 12A and 12B show examples of display on the display device. The example of FIG. 12A is of a case where the inquiry location is specified as "LAN" and the inquiry person (user) as "Nancy Smith" with no function specified, with an assumption that the jobs shown in FIG. 11A are registered The example of FIG. 12B is of a case where a function is specified such that "(input source/output destination information)=facsimile," with an assumption that the jobs shown in FIG. 11A are registered.

Jobs are thus extracted and displayed, whereby the user can obtain necessary job information quickly and easily even if the image processing apparatus that is shared via communication lines, etc. is to perform a large number of jobs.

C-4: Process Item Recognition

A description will be made of a process in which setting-enabled process items are displayed in accordance with the data type or the input source information of job attribute information from among user-specified process items, to thereby allow the user to recognize those process items. Although in the following description the process items are limited to those of the image processing information, the invention is not limited to such a case.

The user performs a predetermined operation on the operation section 104 as in the case of the above-described job list display etc. In response, the UI control task 14 executes a program shown in FIG. 7.

Figure 7:
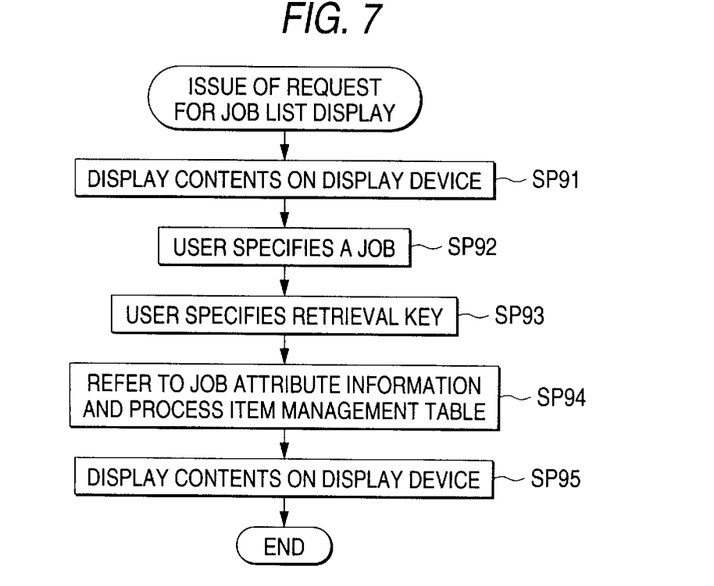
FIG. 7 is a flowchart showing a job information recognition process in the image processing apparatus.

First, at step SP91 of the program, the UI control task 14 causes all registered jobs to be displayed on the display device of the operation section 104, for instance, in the format shown in FIG. 11A as in the case of the job list display etc.

Figure 13A:
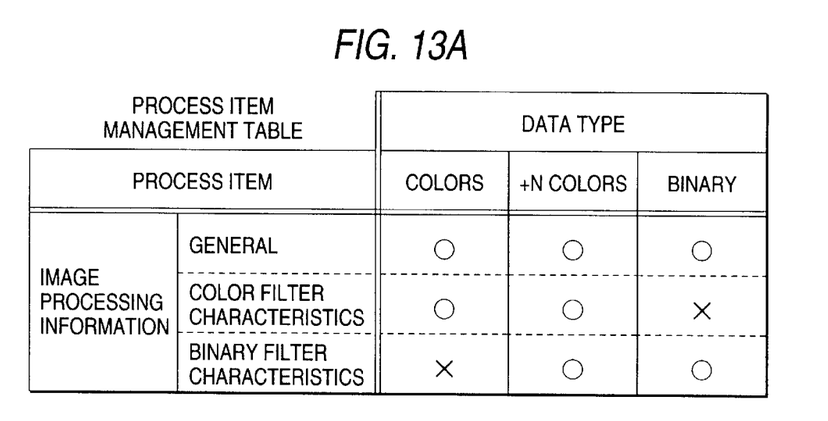
FIGS. 13A and 13B show process item management tables used in the image processing apparatus.
Figure 13B:
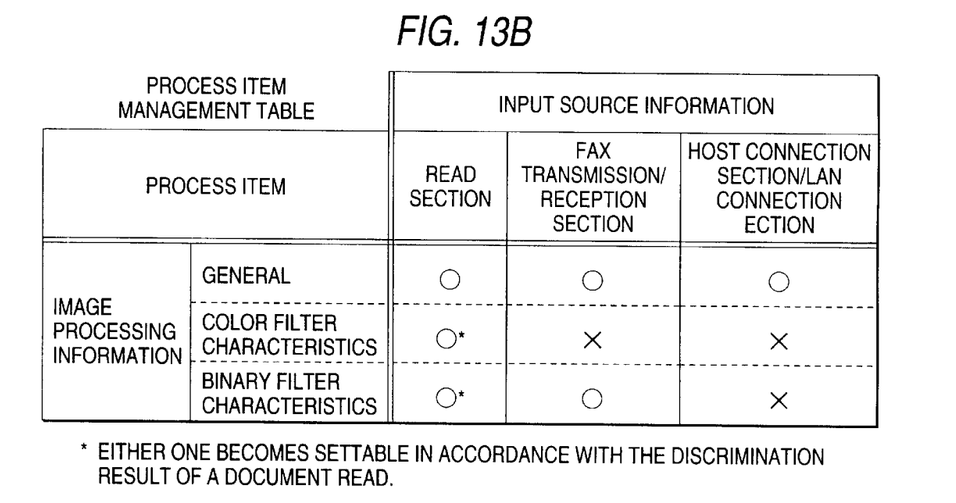

Next, the user specifies a job for which he wants to have process items displayed from among the displayed job list at step SP92, and further specifies the data type or input source information as a retrieval key at step SP93. In response, at step SP94, the UI control task 14 first reads the data type or input source information specified at step SP93 from the job attribute information of the specified job, and then reads entries of the image processing information from the process item management table in accordance with the readout data type or input source information. FIGS. 13A and 13B show examples of process item management table examples.

The example of FIG. 13A is used when the data type is specified as the retrieval key. In FIG. 13A, the data type "color" means the data format in which a color is represented by multiple gradations and "+N colors" means the data format made up of several colors such as black and red. The data type "binary" means the binary data format such as black and white.

Among the process items of the image processing information, "general" means that items related to composition and edit such as Nup and magnification can be set, and "color filter characteristics" means that items concerning natural color correction such as hue, lightness, and chroma can be set. "Binary filter characteristics" means that items concerning black correction such as edge enhancement and lightness correction can be set.

Now, if the data type of the job attribute information is the "color" in FIG. 13A, two items of "general" and "color filter characteristics" can be set for the job concerned. If the data type is "+N colors," three items of "general," "color filter characteristics," and "binary filter characteristics" can be set for the job concerned If the data type is "binary," two items of "general" and "binary filter characteristics" can be set for the job concerned If the data type is of a print description language (not shown), print parameters such as the font type corresponding to the language and the color of a specific font can be altered in addition to the items of "general."

On the other hand, the table of FIG. 13B is used when the input source information is specified as a retrieval key. As shown FIG. 13B, if the input source information of the job attribute information is the read section 106, three items of "general," "color filter characteristics," and "binary filter characteristics" can be set for the job concerned. As for the latter two items, either one can be set in accordance with a detection result of a ratio between image data and text data contained in the job.

If the input source information of the job attribute information is the FAX transmission/reception section 108, two items of "general" and "binary filter characteristics" can be set for the job concerned In addition, for example, confidential, redirection, and broadcast address information among the process items of the output destination information can be altered.

If the input source information of the job attribute information is the host connection section 105 or the LAN connection section 109, only "general" can be set for the job. In addition, for example, output device addition is possible among the process items of the output destination information.

Thus, at step SP94, the items that can be corrected or altered can be found in accordance with the data type or input source information of the specified job by referencing FIG. 11A or 11B.

At step SP95, the UI control task 14 causes the items that can be corrected or altered on the display device of the operation section 104.

When the input source information is specified and it is the read section 106, which of "color filter characteristics" and "binary filter characteristics" can be set is not determined until the ratio between image data and text data contained in the job is detected. In this case, the time that is required until all pages of an original document are read by the read section 106 and the ratio between image data and text data is detected is displayed on the display device of the operation section 104. In the embodiment, the time is calculated from the time required for reading one page of the original document and the number of pages.

Figure 14:
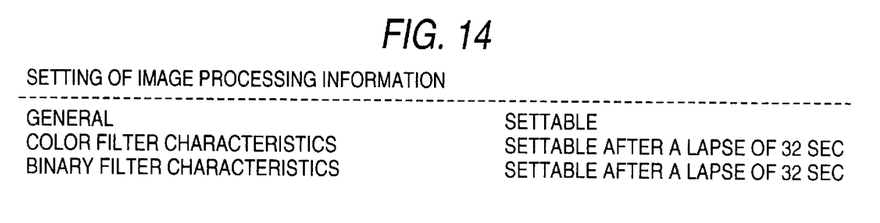
FIG. 14 shows an example of display on the display device of the image processing apparatus.

FIG. 14 shows an example of display on the display device, which is of a case where the input source information is specified and it is the read section 106. For "color filter characteristics" and "binary filter characteristics," the time that is taken until all pages of an original document are read to render either item settable is also displayed.

As described above, setting-enabled items are displayed in accordance with the data type or input source information of the job, which allows the user to recognize the information of the specified job quickly and easily.

D: Modification

In the embodiments, the UI control task 14 perform control relating to operations and display on the operation section 104. However, for example, a counterpart of the operation section 104 may be realized on the client 150 and the client 150 may be controlled via the LAN 200.

As described above, the invention produces the following advantages.

Since jobs can be set and altered easily, the ease of operation of an image processing apparatus having various functions can be improved.

In altering the content of a process item, settable process items are displayed in accordance with the job state of a job concerned. Since the user is only required to alter the content of a desired one of the displayed process items, he can alter it correctly and quickly Further, since each of the settable process items can be set within an effective time, i.e., a time until the process item become unalterable, it can be prevented a case that a process item alteration becomes impossible halfway Even in a case where a plurality of jobs occur, the information concerning the necessary job can be obtained correctly and quickly.

Since a time during which job setting is possible or a time point at which job setting becomes possible is displayed, instructions with respect to jobs can be made properly, that is, the possibility of operation mistakes can be reduced.

What is claimed is:

1. An image processing apparatus, comprising:

image processing means for performing image processing on image data of input jobs;

execution state recognizing means for recognizing an execution state of a specified job;

process item recognizing means for recognizing a process item or items of the image processing performed by the image processing means:

process item determining means for determining an alterable process item or items relating to the specified job in accordance with the recognized execution state of the specified job;

processing item display means for displaying the alterable process item or items;

process item altering means for altering the alterable process item or items, and time calculation means for calculating a time from a time point when an instruction of an alteration of the alterable process item or items is made in the process item altering means to a point when the alteration becomes impossible.

2. The image processing apparatus according to claim 1, further comprising:

process item specifying means for specifying one of the process item or items being displayed by the process item display means.

3. The image processing apparatus according to claim 2, further comprising process suspending means for suspending the image processing of the specified process item or items.

4. The image processing apparatus according to claim 3, wherein the process suspending means suspends image processing of the specified process item or items if the time calculated by said time calculation means is a predetermined value or less.

5. The image processing apparatus according to claim 2, further comprising process suspending means for suspending the image processing for all jobs when the process item altering means alters the specified process item or items.

6. The image processing apparatus according to claim 1, further comprising job extracting means for extracting a job having a given function from the jobs for which the image processing is performed by the image processing means, wherein the process item display means displays the process item or items relating to the extracted job.

7. The image processing apparatus according to claim 6, further comprising function specifying means for specifying a function of a job to be extracted by the job extracting means.

8. The image processing apparatus according to claim 1, wherein the calculated time is based on at least one of attribute information of a specified process item or items, a measured load state of the apparatus, and previous measured values and the apparatus further comprises time display means for displaying the calculated time, the displayed time being updated on a real-time basis.

9. An image processing apparatus, comprising:

image processing means for performing image processing on image data of input jobs;

execution state recognizing means for recognizing an execution state of a specified job;

process item recognizing means for recognizing a process item or items of the image processing performed by the image processing means:

process item determining means for determining one of an alterable process item or items and an unalterable process item or items relating to the specified job in accordance with the recognized execution state of the specified job;

process item display means for displaying the one of the alterable process item or items and the unalterable process item or items; and process item altering means for altering the alterable process item or items;

time calculation means for calculating a time that is taken until alteration of the alterable process item or items being displayed by the process item display means becomes impossible.

10. The image processing apparatus according to claim 9, further comprising:

time display means for displaying the calculated time, the displayed time being updated on a real-time basis.

11. The image processing apparatus according to claim 1, wherein the process item determining means determines the process item or items from among the process item or items recognized by the process item recognizing means.

12. The image processing apparatus as claimed in claim 11, wherein the process item recognizing means recognizes the process item or items based on a function of an input medium of the specified job.

13. A display control method for an image processing apparatus, comprising the steps of:

performing image processing on image data of input jobs;

recognizing an execution state of a specified job;

recognizing a process item or items of the image processing performed by the image processing means;

determining an alterable process item or items relating to the specified job in accordance with the recognized execution state of the specified job;

displaying the alterable process item or items;

altering the alterable process item or items; and calculating a time from a time point when an instruction to alter the alterable process item or items is made to a point when the alteration becomes impossible.

* * * * *